United States Patent [19]
Witmer et al.

[11] Patent Number: 6,125,891
[45] Date of Patent: *Oct. 3, 2000

[54] REFRACTORY U-BENDS AND METHODS OF MANUFACTURE

[75] Inventors: Mark L. Witmer; Martin R. Metzger, both of Painted Post, N.Y.

[73] Assignee: Silicon Carbide Products, Inc., Painted Post, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/616,673

[22] Filed: Mar. 15, 1996

[51] Int. Cl.$^7$ ........................................................ F16L 9/00
[52] U.S. Cl. ........................... 138/177; 138/106; 138/178; 285/134.1; 285/179
[58] Field of Search ........................... 138/DIG. 11, 177, 138/178, 106, 107; 285/61, 62, 63, 64, 134.1–136.1, 179

[56] References Cited

U.S. PATENT DOCUMENTS

| | | |
|---|---|---|
| 136,453 | 3/1873 | Pancoast et al. . |
| 489,827 | 1/1893 | Newlin . |
| 984,652 | 2/1911 | Esch . |
| 1,130,533 | 3/1915 | Pictet . |
| 1,710,530 | 4/1929 | Bell . |
| 2,966,372 | 12/1960 | Phillips ................................... 138/143 |
| 3,568,723 | 3/1971 | Sowards . |
| 3,973,623 | 8/1976 | Sarll . |
| 4,082,863 | 4/1978 | Dancy et al. ............................ 427/181 |
| 4,206,553 | 6/1980 | Ellison et al. . |
| 4,366,859 | 1/1983 | Keyes ....................................... 165/184 |
| 4,600,038 | 7/1986 | Matsui et al. ........................... 138/140 |
| 4,615,992 | 10/1986 | Murphy . |
| 4,648,243 | 3/1987 | Korkemeier .............................. 60/272 |
| 4,733,889 | 3/1988 | Haines ....................................... 285/16 |
| 4,788,036 | 11/1988 | Eiselstein et al. . |
| 4,795,885 | 1/1989 | Driggers et al. . |
| 4,820,359 | 4/1989 | Bevilacqua et al. . |
| 4,865,353 | 9/1989 | Osborne .................................... 285/16 |
| 4,969,964 | 11/1990 | Crum et al. . |
| 5,031,665 | 7/1991 | Chen et al. . |
| 5,061,377 | 10/1991 | Lee et al. . |
| 5,064,620 | 11/1991 | Beuret . |
| 5,265,918 | 11/1993 | Ward et al. . |
| 5,462,817 | 10/1995 | Hsu . |

FOREIGN PATENT DOCUMENTS

255802  1/1963  Australia .

OTHER PUBLICATIONS

Brochure from Industrial Utilization Project Advisors Group Meeting (May 24, 1995).
INEX Brochure "Composite Radiant Tubes".
Brochure from Industrial Utilization Project Advisors Group Meeting (May 24, 1995).
INEX Brochure "Composite Radiant Tubes".
Carborundum Brochure "Hexology High Performance Engineered Silicon Carbide, "(1982).

*Primary Examiner*—William Stryjewski
*Attorney, Agent, or Firm*—Nixon Peabody LLP

[57] ABSTRACT

A curved pipe segment, preferably a U-bend made from a silicon carbide-containing material having a body portion with an inner and outer surface, an inner bend circumference of curvature and an outer bend circumference, and an inlet end and an outlet end, said pipe segment having an integrally molded support flange extending from the outer surface near the center of the body portion, along the outer bend circumference.

13 Claims, 6 Drawing Sheets

REFRACTORY U-BENDS AND METHODS OF MANUFACTURE

FIELD OF THE INVENTION

The present invention is directed to pipe components made from refractory materials comprising silicon carbide, especially tubular pipe segments such as U-bends, and methods for their manufacture.

BACKGROUND OF THE INVENTION

In the field of heat treating, objects to be treated are subjected to extremely high temperatures ranging from about 500° C. to about 1500° C. for varying time durations. The machinery used to apply the desired heat treatment must also be able to withstand extreme heat conditions of the process. Metals were the first materials available for such applications. However, even the most durable metals and metal alloys suffered from structural fatigue due in part to oxidation and carburization. Curved pipe segments, i.e. pipe segments having a curved centerline, also suffered from the additional problem of being more flexible and weaker than the straight pipe segments.

Alternative materials were investigated as they became available. Ceramics and other refractory materials were incorporated into components for heat-treating systems. Layers of monolithic refractory materials were first applied to steel piping used in heat-treating systems. While such ceramic layers imparted additional strength (and reduced flexibility) to the U-bends, various manufacturing constraints kept such materials from being commercially successful. Such ceramic-lined parts still began to fail when exposed to temperatures in excess of 1000° C. for the necessary prolonged periods of heat-treating processes.

Further it was expensive to manufacture such lined pipes. The steel layers being coated had to be pretreated or presented with barb-like anchors or filaments to retain the ceramic layer which increased the overall manufacturing cost. In addition, shrinkage problems were experienced as the ceramic material dried. Such shrinkage problems led to inconsistent layering characteristics at best, and outright material failure in the form of the ceramic layer cracking, peeling, etc. at worst.

In addition, during heat-treating applications piping with internal ceramic coatings, especially at bends, would necessarily experience accentuated effects of material expansion and contraction. Therefore the material used to make the bends would need to be resilient and behave flexibly without being too flexible.

Better methods of casting and extruding ceramic piping were developed, and straight segments of durable and acceptable ceramic piping were achieved. However, repeated attempts to manufacture the required curved segments of ceramic pipe for use in the high temperature heat-treating systems met with failure. Particular difficulty came in manufacturing "U-bends". U-bends are segments of piping which are used to redirect, in one segment, the flow contained within a piping system by 180 degrees, or a direction close to 180 degrees. The overall shape of the pipe segment is therefore that of a "U". Acceptable ceramic U-bends useful in heat-treating systems could not be made according to conventional molding systems due largely to initial manufacturing problems, such as material shrinkage, as the ceramic dried. Without useful bend segments, the widespread use of linear ceramic piping in the heat-treating field remains stymied.

The success and usefulness of a ceramic heat-treating system depends upon the entire system being able to uniformly withstand certain temperatures for prolonged periods. The inability to successfully develop reliable ceramic U-bend pieces has hampered the effectiveness of ceramic pipe heat-treating systems. A method of reliably casting ceramic U-bend segments able to withstand the severe temperature conditions of heat-treating systems would be highly advantageous.

SUMMARY OF THE INVENTION

The present invention is directed to a curved pipe segment. The pipe segment has a body portion with an inner and outer surface. The distance between the inner and outer surface is the thickness of the pipe segment. The pipe segment further has an inner bend circumference and an outer bend circumference, and an inlet end and an outlet end. The pipe segment is made from a material comprising a refractory material and is able to withstand temperatures of from about 1500° C. to about 1600° C.

The present invention also relates to a curved pipe segment for use in a heat-treating system. The pipe segment has a body portion with an inner and outer surface. The distance between the inner and outer surface is the thickness of the pipe segment. The pipe segment further has an inner bend circumference and an outer bend circumference, and an inlet end and an outlet end. The pipe segment is made from a material comprising a refractory material and has an integrally molded support flange extending from the outer surface near the center of the body portion along the outer bend circumference.

The present invention also relates to a method of making a curved pipe segment made from a refractory material. A mold made from joined molding pieces is provided for making a curved pipe segment. The molding pieces join together to form a molding cavity. A spacer insert is placed and held in position within the molding cavity to form a hollow passage in the pipe segment. Refractory material is provided in the form of a flowing mixture and introduced into the mold via the mold inlet. The inlet directs the mold mixture into the mold cavity. The completely filled inlet section of the mold becomes an integrally molded support flange of the molded curved pipe segment. The mold is opened, and the curved pipe segment is dried and removed from the mold.

The present invention relates to yet another method of making a curved pipe segment made from a refractory material. A mold is provided and made from a plurality of mold segments joined together to form a molding cavity having mold cavity walls. A refractory mixture is provided and introduced into the mold assembly. The mold is completely filled with refractory mold material and allowed to partially set and adhere to the mold cavity walls for a predetermined time to achieve a predetermined wall thickness. The mold assembly is then inverted and the mold cavity is emptied of remaining mold material. The mold is opened allowing the molded pipe segment to dry. When dry, the pipe segment is removed from the mold and heat cured if desired.

DETAILED DESCRIPTION OF THE INVENTION

Figure 1:
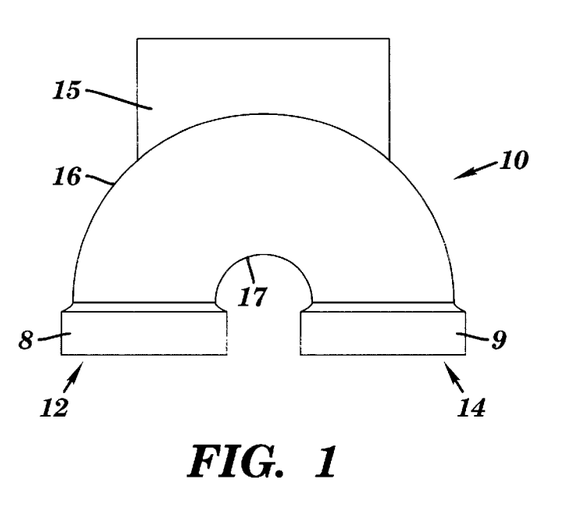
FIG. 1 is a perspective side view of the ceramic U-bend with support flange.
Figure 2:
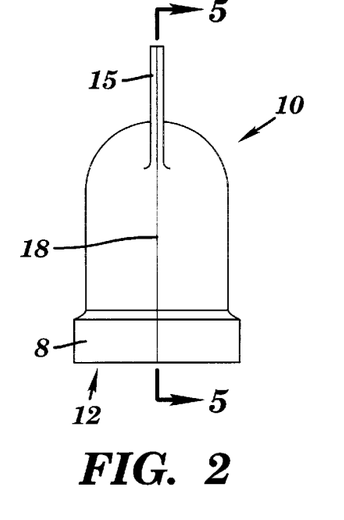
FIG. 2 is a longitudinal view of the ceramic U-bend.
Figure 3:
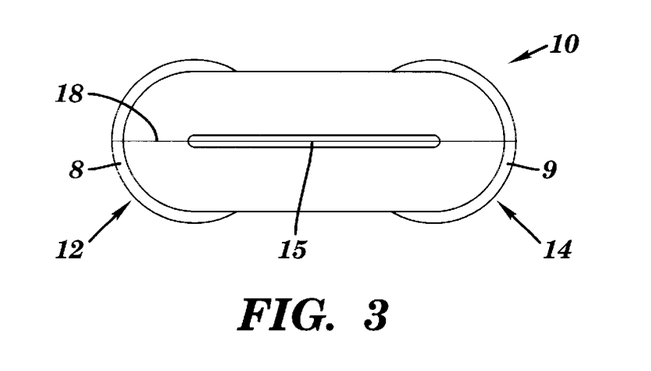
FIG. 3 is an overhead view of the ceramic U-bend.
Figure 4:
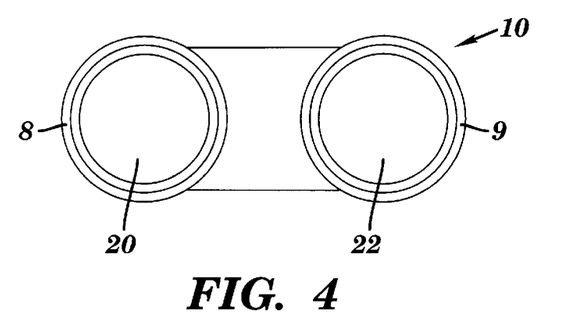
FIG. 4 is a view into the U-bend openings.

The invention will now be described in detail with reference made to the Figures. FIGS. 1–4 show U-bend 10 having an inlet end 12 with inlet flange 8 and an outlet end 14 with outlet flange 9. Support flange 15 is integrally molded into the U-bend and extends from the outer bend circumference 16 along mold seam 18. Inner bend radius 17 is also shown. FIG. 4 shows a view of U-bend 10 with a view into inlet end opening 20 and outlet end opening 22.

Figure 5:
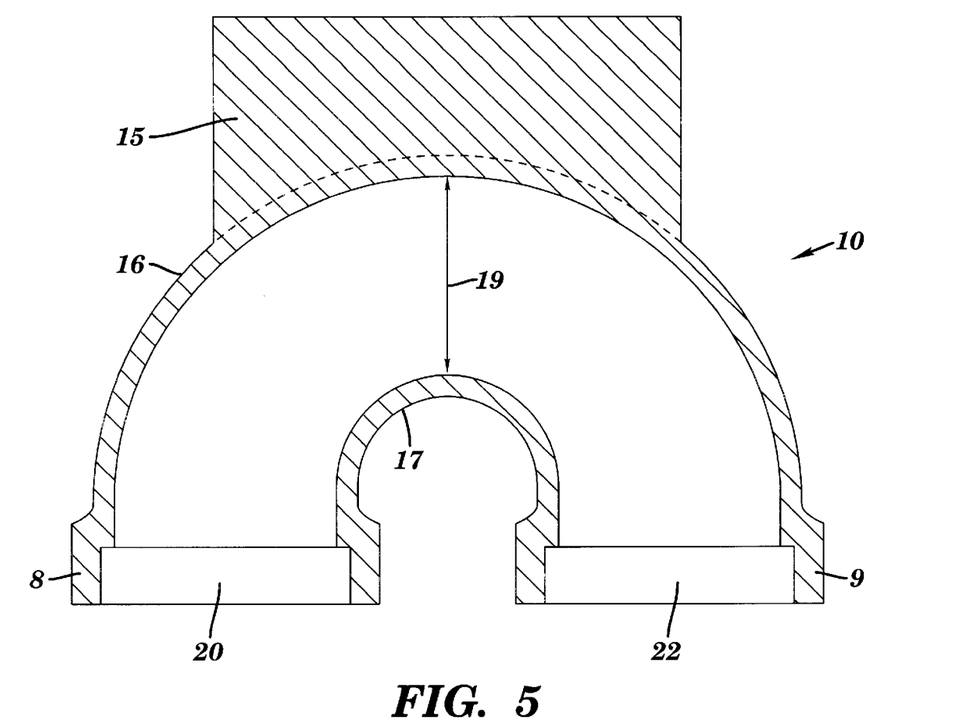
FIG. 5 is a cross-sectional side view of the ceramic U-bend.
Figure 6:
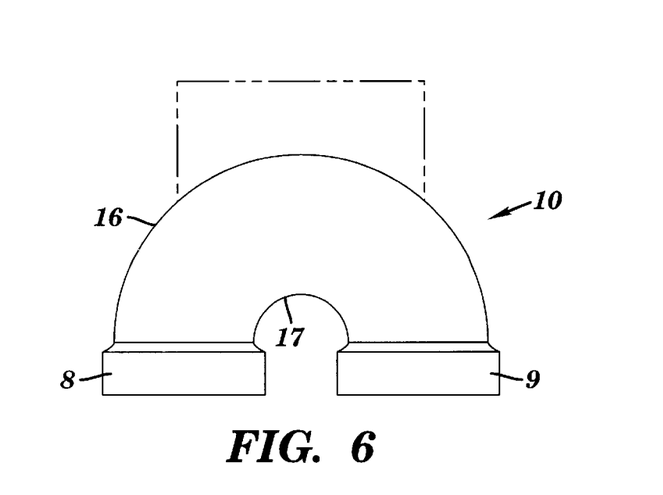
FIG. 6 is a side view of the U-bend.

FIG. 5 is a cross-sectional view of U-bend 10 showing in detail support flange 15 located along outer bend circumference 16. U-bend 10 also has an inner bend circumference 17 and an inner diameter 19. FIG. 6 shows a view of U-bend 10 with support flange 15 removed and shown as a dotted line.

Figure 7:
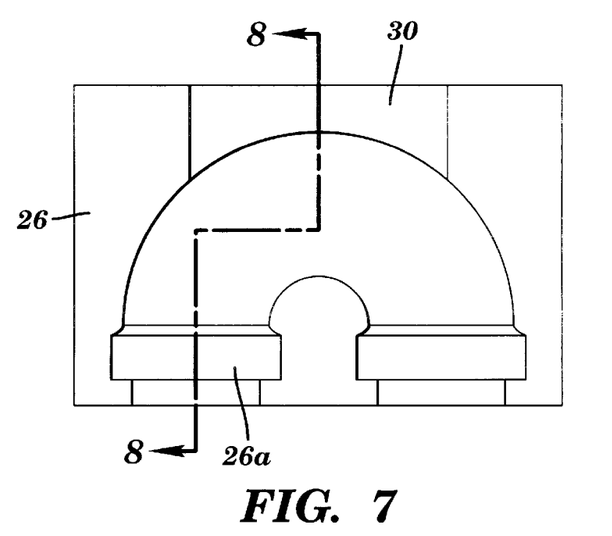
FIG. 7 is a view of an opened mold half used to mold the U-bend.
Figure 8:
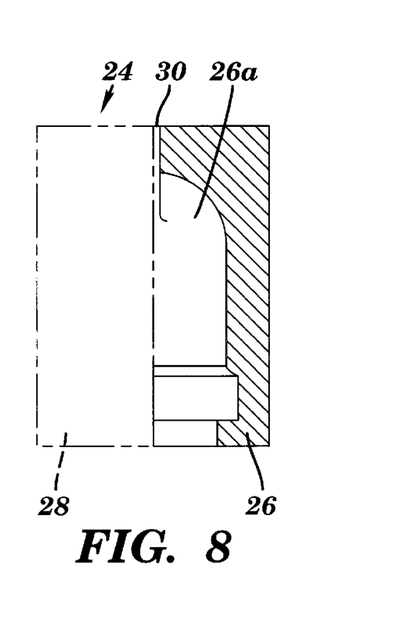
FIG. 8 is a sectional view of the mold assembly with the mold halves closed.
Figure 9:
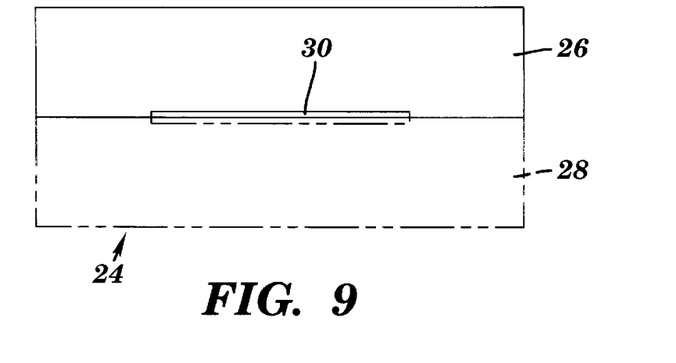
FIG. 9 is an overhead view of the mold assembly showing the inlet.
Figure 10:
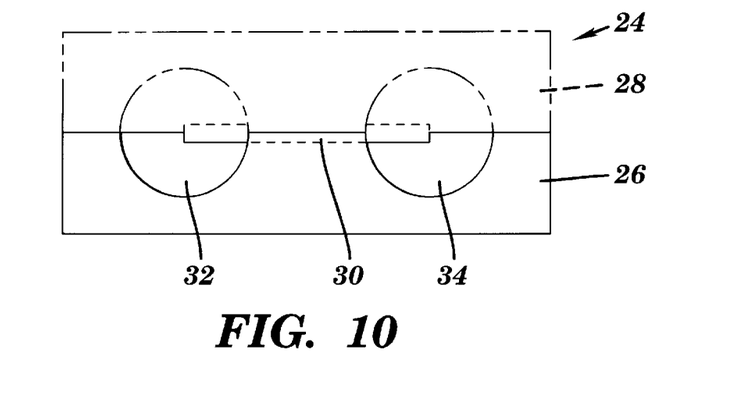
FIG. 10 is an upward view of the bottom of the mold assembly.

FIGS. 7–10 show mold assembly 24 used to mold U-bend 10. Mold assembly 24 comprises first mold segment 26 and second mold segment 28. When mold segments 26, 28 are clamped together by a clamping means (not shown) to receive a ceramic mixture, the mixture is introduced to mold assembly 24 through mold inlet 30. FIG. 7 shows mold segment 26 with mold cavity 26a exposed to view. FIG. 8 shows mold segment 26 in position with mold segment 28 and viewed across line 8 of FIG. 7. FIG. 9 shows a top view of mold assembly 24 with inlet 30 in plain view. FIG. 10 shows mold openings 32, 34 formed when mold segments 26, 28 are brought into the molding position to form mold assembly 24. In these views it is clearly visible that support flange 15 is integrally molded into U-bend 10. Support flange 15 is formed by molding material which completely fills the mold inlet 30.

Figure 11:
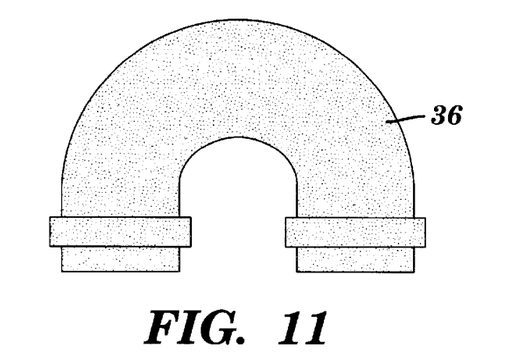
FIG. 11 is a side view of a spacer insert.
Figure 12:
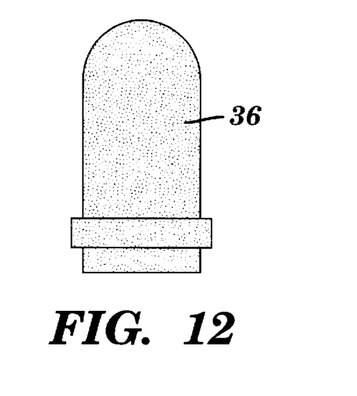
FIG. 12 is an end view of a spacer insert.
Figure 13:
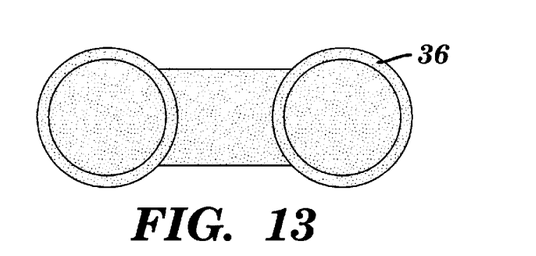
FIG. 13 is a bottom view of a spacer insert.
Figure 14:
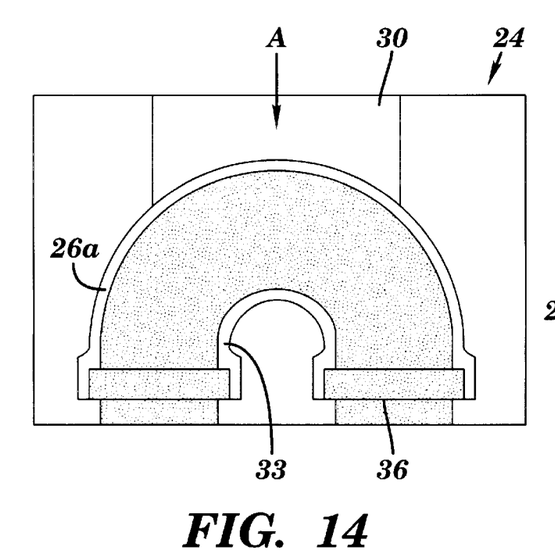
FIG. 14 is a plan view of a spacer insert resting in the cavity of a mold half.
Figure 15:
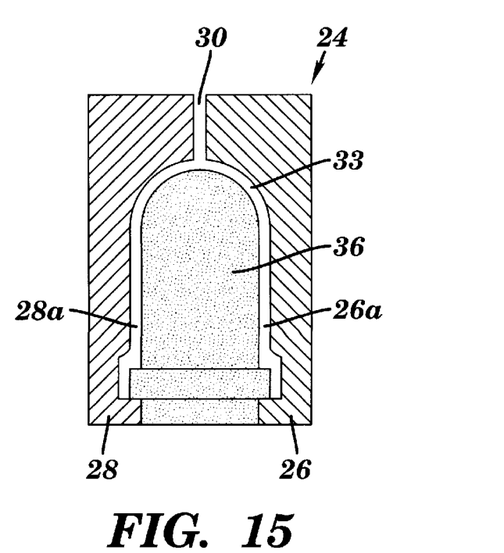
FIG. 15 is a cross-sectional end view of the styrofoam spacer positioned within the mold cavity formed by the two mold halves.

FIGS. 11–13 show views of spacer insert 36 used in conjunction with mold assembly 24 to form the passageway in U-bend 10. Spacer insert 36 is held in position between mold segments 26, 28 in their closed position. FIG. 14 shows spacer insert 36 in position resting in mold cavity 26a. FIG. 15 shows an end view of mold assembly 24 with spacer insert 36 held in place between mold segments 26, 28. Inlet 30 leads to molding cavity 33 which is comprised of the two mold segment cavities; 26a combined with 28a. Spacer insert 36 is inserted into molding areas 26a, 28a before mold segments 26, 28 are shut in order to obtain a specifically dimensioned channel or passageway through U-bend 10. Arrow A indicates the direction in which mold material is introduced to mold inlet 30.

Figure 16:
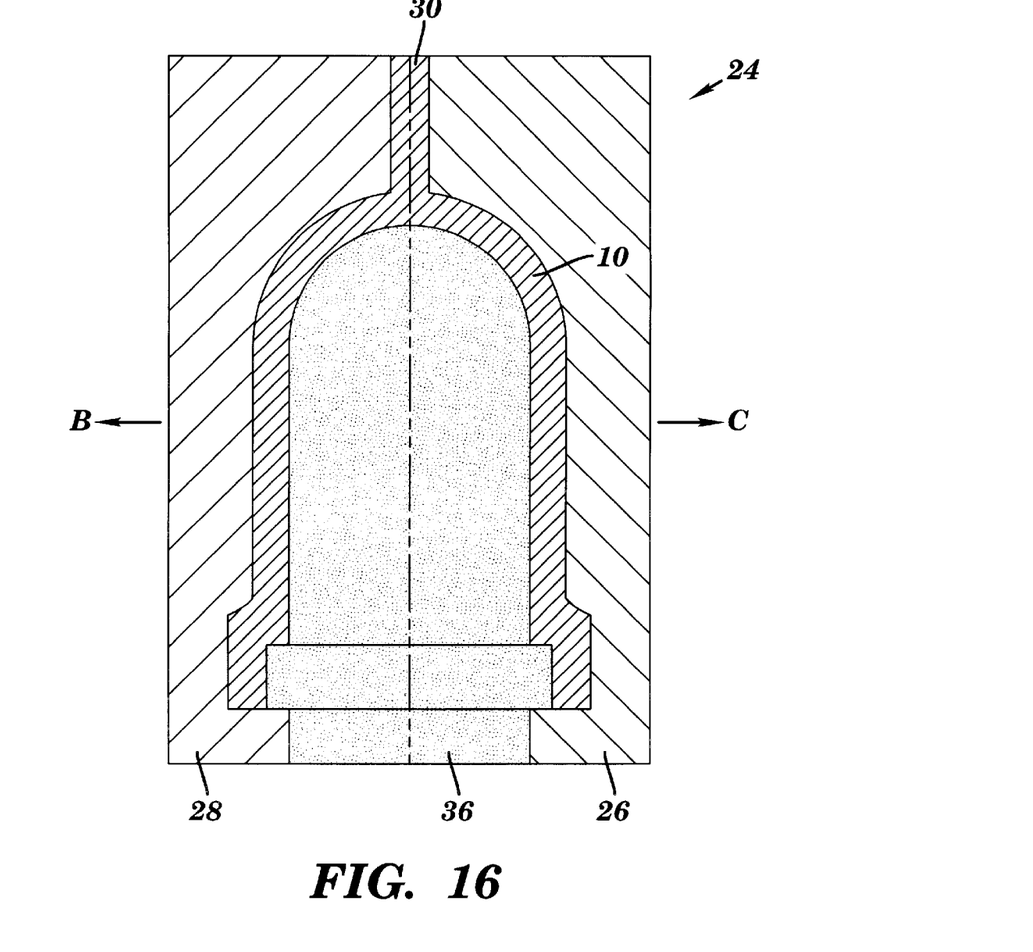
FIG. 16 is a cross-sectional end view of the U-bend being molded within the mold cavity and about the styrofoam spacer insert.

FIG. 16 shows a cross-sectional end view of ceramic mold material already introduced into mold assembly 24 filling the mold cavity around spacer insert 36 and solidifying into U-bend 10. Mold segment 28 is separated in the direction of arrow B from mold segment 26 which is separated in the direction of arrow C.

Figure 17:
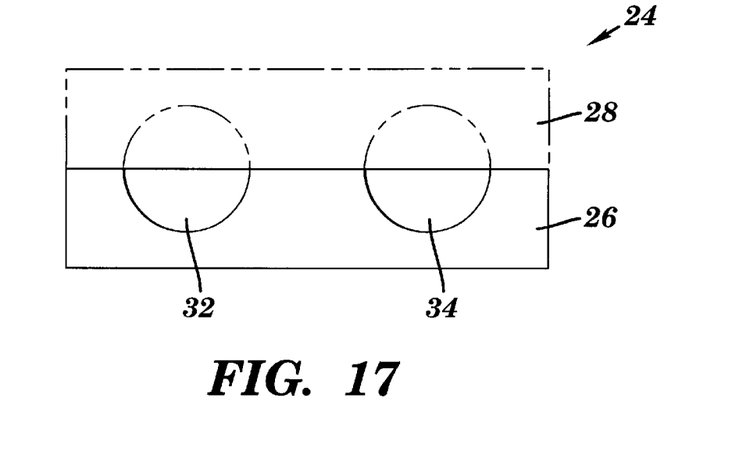
FIG. 17 is a view of the bottom of the mold used to make curved pipe segments according to the slip or drain molding method.

FIG. 17 shows a bottom view of mold assembly 24 with mold openings 32, 34 into which mold mixture is poured when using a slip casting or drain casting regimen. Note that in FIG. 17, there is no inlet 30 present. The only openings to the mold are mold openings 32, 34 which become the inlet and outlet flanges in the molded U-bend.

Figure 18:
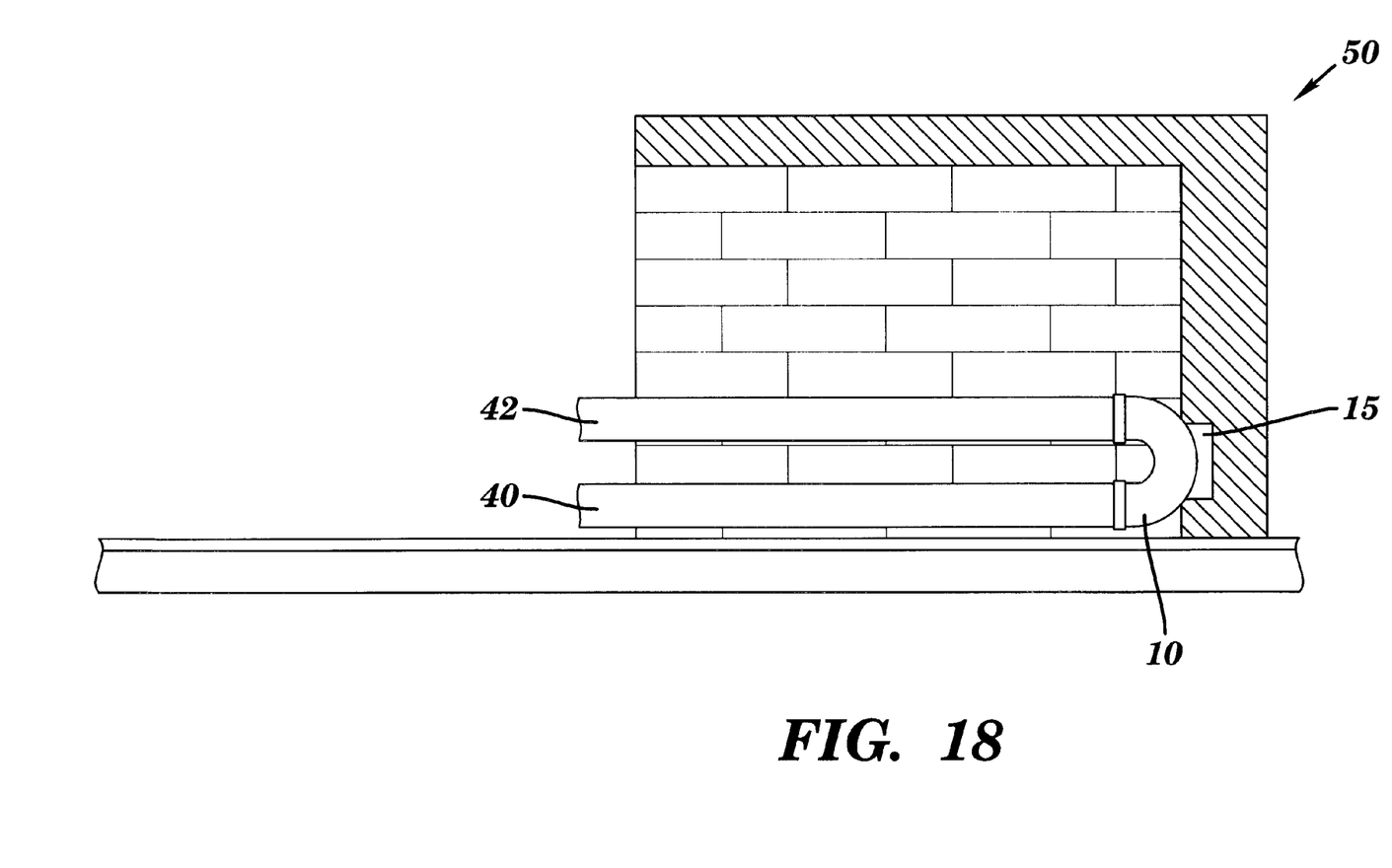
FIG. 18 is a view of the U-bend connected to an inlet and an outlet pipe used in a heat-treatment furnace.

FIG. 18 shows a heat treatment furnace with ceramic inlet pipe 40 and outlet pipe 42 connected to U-bend 10. Support flange 15 is shown built into the furnace wall and acts as a positioning aid for the U-bend and heat tubes as the furnace wall is built. Conventional heat-treating systems incorporate state of the art refractory materials as tube materials for radiant tubes. Refractory materials are understood to be ceramic materials capable of withstanding extremely high temperatures of from about 1200 to about 1350° C. without experiencing structural change, or deformation.

The refractory materials used in connection with the present invention may be any refractory material which may be manufactured in a mold to yield curved pipe segments having the characteristics necessary to be incorporated into a heat-treating system using radiant heating. Preferred refractory materials include refractory oxides, carbides, nitrides, sialons, and composites and combinations thereof. These aforementioned materials may be reaction bonded, sintered, recrystallized, whisker reinforced or infiltrated, chemically vapor deposited, or have any combination of these processes performed upon them. Preferred are silicon carbides and materials comprising silicon carbides, with the silicon nitride-bonded silicon carbides being most preferred.

The preferred refractory material when molded as a U-bend has a thermal expansion coefficient of from about $4.2 \times 10^{-6}$/°C. to about $5.2 \times 10^{-6}$/°C., with a coefficient of about $4.8 \times 10^{-6}$/°C. being particularly preferred. The preferred refractory material when manufactured into a U-bend has a thermal conductivity value of about 18 watts/meter-°K. Further, the preferred refractory material used to make the curved pipe segments of the present invention must be able, in use, to withstand high temperatures and have a maximum tube temperature of from about 1250° C. to about 1400° C. for about 200 to at least about 500 hours. U-bends made from the preferred silicon nitride-bonded silicon carbides preferably experience no deformation up to temperatures even up to from about 1500° C. to about 1600° C.

The ceramic U-bends of the present invention can be made from any molding process where a molding cavity is formed by securing together mold sections. The use of single use molds made from one piece is also contemplated. These molds are used for so-called thixotropic molding methods. In this method, to mold a hollow part, such as a U-bend, a spacer insert is positioned within the mold cavity to occupy the area which will become the hollow passageway of the U-bend. The spacer insert may be made from any material, but is preferably a material such as styrofoam which is pliable, non-reactive with the mold material, and which will disintegrate under heat or which may be otherwise removed easily and completely from the U-bend. After the spacer insert is positioned and the mold tightly fastened together, a liquid, semi-solid or powdered material is introduced into a mold cavity through a mold inlet or sprue. The preferred mold material is in the form of a semi-solid or slurry. A semi-solid is understood to be a thick slow-moving material capable of flowing like a liquid.

The mold segments may be held together tightly by any securing means, and is preferably a clamp mechanism or strap. In the thixotropic method, a vibration means may be optionally attached to impart a vibrational force to the mold. The vibration insures the complete and even filling of the mold cavity, and increases the rate at which the mold cavity is filled by the mold material.

In addition, U-bends of the present invention made from refractory materials may be molded according to slip casting or drain casting methods. According to these methods, a single mold or assembled mold sections provide a mold cavity which is filled with a liquid, or semi-solid mold material. Unlike the thixotropic method, the mold mix is not introduced via any inlet or sprue. The material is introduced into the mold cavity directly through mold openings 32, 34 as shown in FIG. 17. The mold material is allowed to set and begin to adhere to the walls of the cavity to a predetermined thickness. Before the material completely sets, the mold is inverted to allow the unset material to run from the mold leaving a molded hollow U-bend with a specified wall thickness in the mold.

The present invention therefore relates to any curved pipe segments made from refractory materials which may be used in heat-treating systems to deliver radiant heat, including U-bends. The U-bends of the present invention may be of any dimension, with inside diameters of any width as desired. For heat-treating applications, the linear piping is generally commercially available in standard sizes with inside diameters of from about 1 to about 8 inches. Therefore, for the U-bends of the present invention to be incorporated into heat-treating systems and fitted to linear pipes, the U-bends are contemplated as preferably having matching internal diameters of from about 1 to about 8 inches, with larger or smaller diameters also being possible if desired, ranging, for example, from about 1 inch up to about 20 inches; no practical size limitation is foreseen.

Linear pipe segments have been successfully manufactured to form strong, durable refractory pipes with a minimum of excess waste material. However, durable curved pipe segments that perform as well as the linear segments to which they were attached have not been manufactured successfully. According to the present invention, the area of the mold inlet leading from the mold exterior to the molding cavity was increased substantially, to create an integrally molded support flange on the U-bend. The support flange increases the structural support to the U-bend when the flange is positioned on the "outside" of the bend; along the outer bend circumference as shown in the FIGS. 1–4.

The support flange also can be used as a positioning aid to more accurately position the U-bend, for example, during the construction of a furnace. For example, the support flange may be secured into brick or masonry work, making it easier to build the U-bend into a furnace wall. See FIG. 18. Further, the support flange can be used as a "foot" for vertical installations, keeping the U-bend itself suspended off the ground.

The U-bends of the present invention have the distinct advantage that they demonstrate improved strength and durability over known U-bends. It is believed that this U-bend strength is not only due to the composition of the refractory material, but is due to the molding technique of having a relatively large inlet or sprue admit mold material into the mold cavity and become an integrally molded support flange along the outer bend circumference.

Another advantage of the support flange is the physical characteristics it seems to impart to the U-bend as a result of facilitating filling the molding cavity. The large opening in the mold inlet (which when filled with mold material becomes the support flange), allows for a more even mold "fill", creating a more homogeneously formed end product U-bend. As the piece is cast, the mix flows to all parts of the mold cavity more evenly than what was experienced with past molds. The large opening area in the mold which, when solid, becomes the support flange, allows the mix to take a more "downward" as opposed to "sideways" path to fill the mold cavity. It is also thought that the abundant supply of mold material placed adjacent to the U-bend itself, helps to defeat the detrimental effects that occur in molded materials due to non-uniform material shrinkage during drying.

The U-bends made according to the methods of the present invention perform equally well in heat-treating environments whether or not the support flange is removed after the molded U-bends have set. Therefore, it is to be understood that the present invention contemplates U-bends made from refractory materials for use in the high-temperature environment of heat-treating systems, which have integrally molded support flanges in their manufacture, but which may be used with or without the support flange in place. The support flange may be removed from the U-bend by any material-removing means including cutting, grinding, sanding, etc.

The specific dimension of the support flange is not critical to the performance enhancement it imparts to the U-bend. However, it is preferred that the support flange extend longitudinally along the outer bend circumference of the body portion of the U-bend at a length of from about one-quarter to about three-quarters of the U-bend's total outer bend circumference, preferably about one-half of the outer bend circumference. The distance the support flange extends away from the U-bend body portion (support flange's height) is also not critical, but is preferably about one-quarter to about three times the length of the U-bend's inside diameter.

EXAMPLES

To illustrate this and other aspects of the invention, the following examples are provided. It should be understood that the purpose of the examples is to illustrate several embodiments of the invention and is in no way intended to limit the scope of the invention. Conventional additives for heat-sensitive compositions other than those mentioned herein can also be included in the composition without departing from the spirit of the invention.

Example 1
Preparation of the Refractory Molding Material

A refractory material used to make the piping of the present invention is made according to the following procedure. To a large batch mixer bowl of a planetary-type mixer is added an amount (about 7 wt. %) of tap water. An amount, (about 10–15 wt. %) of Si metal having a particle size of less than about 20 μm is added to the water. An amount (about 1 wt. %) of a triethanolamine salt of linear sulfonic acid acting as a dispersant, (Witco Chemical), is added to the mix and mixed for 2 minutes. A clay, in an amount of about 5 to about 10 wt. %, is added to the mix and mixed for one minute. A sodium polymethacrylate deflocculant, (Vanderbilt Corp.), in an amount of about 1 wt. %, is added to the mix and mixed for two minutes. An amount of SiC totalling about 60 to about 75 wt. % is added to the mix and mixed for two minutes. An amount (about 1 wt. %) of a silica dispersion in vegetable oil acting as a defoamer (PPG-Mazar Chemical), is added to the mix and mixed for one minute. Finally, an additional amount of water is added to bring the total weight % of the mixture to 100%.

Example 2
Physical Characteristics of the Fired Silicon Nitride-Bonded Silicon Carbide The physical properties of the preferred silicon nitride-bonded silicon carbide prepared according to Example 1 were investigated with the results presented below.

| Bulk Density | 2.62 g/cc |
| | 163 lb/ft$^3$ |
| Porosity | 16% |
| Modulus of Rupture | 65.5 MPa |
| | 9500 psi |
| Coef. of Linear Thermal Expansion | 4.8 × 10$^{-6}$ ° C. |
| Thermal Conductivity | 18 W/m ° K. |
| Maximum Safe Operating Temp. | 1525° C. |
| | 2777° F. |

Example 3
Silicon Carbide Composition

Based upon the desired qualities, the chemical composition of the silicon nitride bonded silicon carbide of Example 1 is as follows:

| Component | Content (wt. %) |
|---|---|
| SiC | 50 to 80 |
| $Si_3N_4$ | 10 to 40 |
| $SiO_2$ | 0 to 5.0 |
| $Si_2ON_2$ | 0 to 20 |
| $Fe_2O_3$ | 0 to 1.0 |
| $Al_2O_3$ | 0 to 15 |

Example 4
Procedure for Molding Silicon Carbide U-Bend

The raw materials are combined to make the mix according to the process of Example 1. A two piece plaster mold for the U-bend is provided with a tubular styrofoam spacer inserted to make the opening in the U-bend. The two mold sections are clamped together with a clamped nylon strap. The mix in poured into the mold assembly under vibration. A mechanical piston vibrator is secured to a bench adjacent the mold. Mix is poured into the mold until the mold cavity is completely filled, evidenced by an excess amount of mix accumulating at the mold inlet. The mold was allowed to set for about one hour at which point the mold was placed on its side and the top mold section removed. The U-bend, now partially exposed to air was air dried for about 2 hours and then removed from the lower mold half. The U-bend was then allowed to dry for an additional 24 hours. The U-bend was then placed into a furnace with a nitrogen atmosphere flooding the furnace. The U-bend was fired at approximately 1400° C. for 2 hours to set the ceramic and incinerate the styrofoam spacer insert. After firing, the U-bend was allowed to cool and inspected for evidence of cracking. The openings were measured to confirm production within dimensional tolerances.

Example 5
Molding of U-Bend by Drain or Slip Casting

A molding mixture prepared according to Example 1 above is provided with the only exception being a water content of from about 20 to about 40% to give a paint-like consistency. A plaster U-bend mold having a mold cavity with no sprue or inlet to the outer bend circumference is used. The mold is oriented on a table such that the inlet and outlet as shown in FIG. 17 is exposed. The mold is then filled with the mixture of Example 1. The plaster mold walls draw water out of the mixture, building up a solid refractory material wall against the mold cavity wall. After a certain time corresponding to the desired wall thickness to be made, the wall buildup is deemed sufficient and the remainder of the mixture which is still liquid (toward the center of the molding cavity) is removed by inverting the mold and allowing the unsolidified mixture to spill from the mold. After a sufficient drying time, the mold is opened, followed by optional additional drying time and the molded curved pipe segment (U-bend) is removed, dried further and fired.

While the present invention has been described in terms of certain preferred embodiments and exemplified with respect thereto, one skilled in the art will readily appreciate that various modifications, changes, omissions and substitutions may be made without departing from the spirit thereof.

What is claimed:

1. A curved pipe segment comprising:
   a body portion having an inner surface and outer surface, an inlet end and an outlet end, and an inner bend circumference and outer bend circumference wherein the inner bend circumference and the outer bend circumference each extend the length of a curved portion of the body portion, between the inlet end and the outlet end of the body portion; and
   an integral support flange extending from the outer surface of said body portion along the outer bend circumference;
   wherein said curved pipe segment consists of a refractory material.

2. The pipe segment of claim 1, wherein the refractory material is selected from the group consisting of refractory oxides, carbides, nitrides, sialons and composites and combinations thereof.

3. The pipe segment of claim 1, wherein the refractory material comprises silicon nitride-bonded silicon carbide.

4. The pipe segment of claim 1, wherein the pipe segment is a U-bend.

5. The pipe segment of claim 1, wherein the inlet end has an inlet flange and the outlet end has an outlet flange.

6. The pipe segment of claim 1, wherein the support flange extends longitudinally along the outer bend circumference of the body portion at a length of from about one-quarter to about three-quarters of the outer bend circumference.

7. The pipe segment of claim 1, wherein the pipe segment has an inside diameter of from about 1 to about 20 inches.

8. The pipe segment of claim 7, wherein the support flange extends from the outer bend circumference of the body portion to a length of from about 0.25 to about 3 times the length of the pipe segment inside diameter.

9. The pipe segment of claim 1, wherein the pipe segment has a thermal expansion coefficient of from about $4.2 \times 10^{-6}$ in/in/°C. to about $5.2 \times 10^{-6}$ in/in/°C.

10. The pipe segment of claim 1, wherein the thermal conductivity provided by the pipe segment is from about 18 watts/meter-°K. to about 150 watts/meter-°K.

11. The pipe segment of claim 1, wherein the pipe segment is able to withstand being heated to a temperature of from about 1500° C. to about 1600° C. with no deformation.

12. A furnace used for heat-treating comprising the pipe segment of claim 1.

13. A curved pipe segment made from a method comprising:

providing a mold for a curved pipe segment said mold comprising cavity;

inserting a spacer insert into and held in position within the molding cavity;

providing a refractory material;

introducing the refractory material into said mold at a mold inlet to the molding cavity, said inlet designed to allow the refractory material left in the inlet to be integrally molded into the curved pipe segment along an outer vend circumference which extends the length of the curved portion of the curved pipe segment;

completely filling the mold;

opening the mold;

drying the pipe segment; and removing the pipe segment from the mold, wherein the pipe segment consists of the refractory marterial and is a U-bend.

* * * * *